(12) United States Patent
Li et al.

(10) Patent No.: US 10,193,609 B2
(45) Date of Patent: Jan. 29, 2019

(54) METHOD FOR FEEDING BACK CHANNEL STATE INFORMATION, BASE STATION AND USER EQUIPMENT

(71) Applicant: CHINA ACADEMY OF TELECOMMUNICATIONS TECHNOLOGY, Beijing (CN)

(72) Inventors: Chuanjun Li, Beijing (CN); Xin Su, Beijing (CN); Yang Song, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 15/771,079

(22) PCT Filed: Dec. 29, 2016

(86) PCT No.: PCT/CN2016/113192
§ 371 (c)(1),
(2) Date: Apr. 25, 2018

(87) PCT Pub. No.: WO2017/071674
PCT Pub. Date: May 4, 2017

(65) Prior Publication Data
US 2018/0316405 A1    Nov. 1, 2018

(30) Foreign Application Priority Data

Oct. 29, 2015  (CN) .......................... 2015 1 0717212

(51) Int. Cl.
*H04B 7/06*    (2006.01)
*H04B 7/0426*  (2017.01)
(Continued)

(52) U.S. Cl.
CPC ........... *H04B 7/0626* (2013.01); *H04B 7/043* (2013.01); *H04B 7/0456* (2013.01); *H04L 5/0048* (2013.01)

(58) Field of Classification Search
CPC .. H04B 7/0456; H04B 7/0615; H04L 27/2601
See application file for complete search history.

(56) References Cited

U.S. PATENT DOCUMENTS 9,369,193 B2 * 6/2016 Kim .................... H04B 7/0456
2014/0086353 A1 * 3/2014 Ni ....................... H04B 7/0482
                                                          375/267

(Continued)

FOREIGN PATENT DOCUMENTS

CN    103746779 A    4/2014
CN    103812545 A    5/2014

(Continued)

OTHER PUBLICATIONS

International Search Report for PCT/CN2016/113192 dated Mar. 22, 2017 and its English translation provided by WIPO.

(Continued)

*Primary Examiner* — Kenneth Lam
(74) *Attorney, Agent, or Firm* — Ladas & Parry, LLP (57) ABSTRACT

A method for feeding back CIS includes: dividing a plurality of antenna ports into a plurality of groups of antenna ports; configuring for each group a same intra-group codebook set consisting of a plurality of intra-group precoding matrices, allocating for each group a plurality of different reference signals corresponding to a same reference resource, and configuring for each antenna port in each group a precoded reference signal acquired after a precoding operation using the intra-group precoding matrices, the number of the reference resources corresponding to the number of the intra-group precoding matrices in the intra-group codebook set, and the number of the reference signals corresponding to (Continued)

each reference resource corresponding to the number of groups of inter-group antenna ports; transmitting the precoded reference signal to a UE via each antenna port; and receiving the CSI fed back by the UE after measurement on the reference signal.

17 Claims, 6 Drawing Sheets

(51) Int. Cl.
  *H04L 5/00* (2006.01)
  *H04B 7/0456* (2017.01)

(56) References Cited

U.S. PATENT DOCUMENTS

| | | | | |
|---|---|---|---|---|
| 2014/0254517 A1* | 9/2014 | Nam | ...................... | H04B 7/0417 370/329 |
| 2015/0016379 A1* | 1/2015 | Nam | ...................... | H04B 7/0456 370/329 |
| 2015/0207547 A1* | 7/2015 | Ko | ...................... | H04B 7/0456 370/252 |
| 2015/0236773 A1* | 8/2015 | Kim | ...................... | H04B 7/0626 375/295 |
| 2015/0289155 A1 | 10/2015 | Gao | | |
| 2015/0304001 A1* | 10/2015 | Tomeba | ................... | H04B 7/04 375/267 |
| 2016/0007340 A1* | 1/2016 | Park | ...................... | H04B 7/0626 370/329 |
| 2016/0050006 A1 | 2/2016 | Ko et al. | | |
| 2017/0310377 A1* | 10/2017 | Kang | ................... | H04B 7/0452 |
| 2017/0310378 A1* | 10/2017 | Kim | ........................ | H04B 7/04 |
| 2018/0198499 A1* | 7/2018 | Park | ........................ | H04B 7/04 |

FOREIGN PATENT DOCUMENTS

| | | |
|---|---|---|
| CN | 103840907 A | 6/2014 |
| WO | 2014171658 A1 | 10/2014 |
| WO | 2015190847 A1 | 12/2015 |

OTHER PUBLICATIONS

Written Opinion of the International Search Authority PCT/CN2016/113192 dated Mar. 22, 2017 and its English translation provided by Google Translate.

3GPP., "3GPP TS 36.213 V12.7 .0", 3rd Generation Partnership Project, Technical Specification Group Radio Access Network, Evolved Universal Terrestrial Radio Access (E-UTRA), Physical layer procedures (Release 12) Sep. 30, 2015.

Written Opinion of the International Search Authority PCT/CN2016/113192 dated Mar. 22, 2017 and its English translationprovided by WIPO Patentscope.

* cited by examiner

METHOD FOR FEEDING BACK CHANNEL STATE INFORMATION, BASE STATION AND USER EQUIPMENT

CROSS-REFERENCE TO RELATED APPLICATIONS

The present application is the U.S. national phase of PCT Application No. PCT/CN2016/113192 filed on Dec. 29, 2016, which claims priority to the Chinese patent application No. 201510717212.6 filed on Oct. 29, 2015, the disclosures of which are incorporated herein by reference in their entireties.

TECHNICAL FIELD

The present disclosure relates to the field of communication technology, in particular to a method for feeding back channel state information (CSI), a base station and a user equipment (UE).

BACKGROUND

Multiple Input Multiple Output (MIMO) technology plays an import role in increasing a peak rate and system spectral utilization, so such radio access technical standards as Long Term Evolution (LTE) and LTE-Advanced (LTE-A) are constructed on the basis of an MIMO and Orthogonal Frequency Division Multiplexing (OFDM) technology. A performance gain of the MIMO technology is derived from a spatial freedom degree capable of being acquired by a multi-antenna system, and a larger data transmission volume is acquired through a larger spatial freedom degree. Hence, the most important development direction of the MIMO technology lies in the extension of dimensions.

In order to further improve the MIMO technology, a massive MIMO antenna technology has been introduced into a mobile communication system. A full-digital massive MIMO antenna includes 128, 256 or 512 antenna elements, 128, 256 or 512 transceivers each connected to one antenna element, and 128, 256 or 512 digital antenna ports. In order to make fully use of the spatial freedom degree caused by the 128, 256 or 512 digital antenna ports, a UE needs to acquire or know spatial channel information about the 128, 256 or 512 digital antenna ports. The acquisition of the spatial channel information directly depends on the number of Channel State Information-Reference Signals (CSI-RSs) used by the 128, 256 or 512 digital antenna ports. A large amount of CSI-RSs may lead to a remarkably large time-frequency resource overhead.

The full-digital massive MIMO antenna is confronted with such a technical problem as the time-frequency resource overhead caused by the large number of CSI-RSs. Hence, there is an urgent need to provide a method for feeding back the CSI, so as to reduce the number of the CSI-RSs.

Currently, for the full-digital massive MIMO antenna, there are usually two methods for feeding back the CSI on the basis of the CSI-RS. One method is based on the CSI-RSs from an antenna unit, i.e., non-beamformed CSI-RSs, and the other method is based on beamformed CSI-RSs.

However, there are some deficiencies for above two methods. For the method based on the non-beamformed CSI-RSs, the antenna unit for each antenna port provides a relatively small gain, usually 5 to 8 dBi for a directional antenna. In this regard, the CSI-RS received by the UE through each antenna port has relatively small power. For the UE within a coverage range of a cell, there are such defects as low received power or loss of the CSI-RS. Usually, this case is called as inadequate CSI-RS coverage, mainly in terms of the coverage range. Hence, the CSI estimated on the basis of the CSI-RS may be inaccurate, and thereby the system performance may be adversely affected.

For the method based on the beamformed CSI-RSs, N beamformed CSI-RSs with a large gain are configured. Due to the beamforming gain caused by the N beamformed CSI-RSs, there is no inadequate coverage range like the non-beamformed CIS-RS, but there may exist an inadequate coverage angle. This because, on one hand, the N beamformed CSI-RSs are associated with an angular range, and in order to cover the entire angular range, N needs to have a large value, resulting in the remarkably large time-frequency resource overhead. If N has a small value, it is impossible to cover the entire angular range. On the other hand, a distribution range of the UEs is unknown to a base station. In the case that the N beamforming CSI-RSs are configured specially for the UEs within a specific range, it is impossible to provide the beamforming gain to the UEs beyond this range, and thereby the system performance may be adversely affected.

SUMMARY

An object of the present disclosure is to provide a method for feeding back CSI, a base station and a UE.

In one aspect, the present disclosure provides in some embodiments a method for feeding back CSI, including steps of: dividing a plurality of antenna ports into a plurality of groups of antenna ports; configuring for each group of antenna ports a same intra-group codebook set consisting of a plurality of intra-group precoding matrices, allocating for each group of antenna ports a plurality of different reference signals corresponding to a same reference resource, and configuring for each antenna port in each group of antenna ports a precoded reference signal acquired after a precoding operation using the intra-group precoding matrices, a number of the reference resources corresponding to a number of the intra-group precoding matrices in the intra-group codebook set, and a number of the reference signals corresponding to each reference resource corresponding to a number of groups of inter-group antenna ports; transmitting the precoded reference signal to a User Equipment (UE) via each antenna port; and receiving the CSI fed back by the UE based on measurement on the reference signal.

In a possible embodiment of the present disclosure, the step of dividing the plurality of antenna ports into the plurality of groups of antenna ports includes dividing, in a row-based or column-based manner, the plurality of antenna ports into the plurality of groups of antenna ports based on one dimension of the antenna ports using a same grouping mode.

In a possible embodiment of the present disclosure, when dividing the plurality of antenna ports based on a vertical dimension of the antenna ports, the step of dividing, in the row-based or column-based manner, the plurality of antenna ports into the plurality of groups of antenna ports based on one dimension of the antenna ports using a same grouping mode comprises dividing every M antenna ports in each column of antenna ports in a vertical direction into one group, each column of antenna ports being divided into a same number of groups, and M representing a predetermined number of antenna ports in each group.

In a possible embodiment of the present disclosure, the reference resource is a CSI-RS resource, and the reference signal is a CSI-RS. The number of the CSI-RS resources is the same as the number of the intra-group precoding matrices in the intra-group codebook set, and the number of the CSI-RSs corresponding to each CSI-RS resource is the same as the number of the inter-group antenna ports. The CSI-RSs corresponding to a same CSI-RS resource allocated for each group of antenna ports are precoded with a same intra-group precoding matrix so as to form beams in a same direction, the CSI-RSs corresponding to different CSI-RS resources allocated for a same group of antenna port are precoded with different intra-group precoding matrices so as to form beams in different directions, and the beams formed by the different intra-group precoding matrices evenly cover an entire angular range in a vertical direction.

In a possible embodiment of the present disclosure, the step of transmitting the precoded reference signal to the UE via each antenna port includes: when the CSI-RS resource is a frequency-domain resource, transmitting the precoded reference signal to the UE via each antenna port within a same subframe; or when the CSI-RS resource is a time-domain resource, transmitting the precoded reference signal to the UE via each antenna port within different subframes.

In a possible embodiment of the present disclosure, the CSI includes an intra-group precoding matrix indicator (PMI), an inter-group PMI, a rank indicator (RI) and a channel quality indicator (CQI).

In a possible embodiment of the present disclosure, the method further includes: measuring, by the UE, the reference signal corresponding to each reference resource, so as to acquire an intra-group PMI to be fed back to a base station; acquiring channel information about the reference signal corresponding to the reference resource corresponding to the intra-group PMI on each group of antenna ports; acquiring an inter-group PMI, a RI and a CQI fed back to the base station based on the channel information; and taking the intra-group PMI, the inter-group PMI, the RI and the CQI as the CSI.

In a possible embodiment of the present disclosure, the step of measuring, by the UE, the reference signal corresponding to each reference resource, so as to acquire an intra-group PMI to be fed back to a base station includes calculating average values of Reference Signal Received Power (RSRP) of the reference signals corresponding to each reference resource on all the groups of antenna ports respectively, acquiring a PMI corresponding to the RSRP having the largest average value, and taking the PMI as the intra-group PMI.

In a possible embodiment of the present disclosure, the step of acquiring the inter-group PMI, the RI and the CQI fed back to the base station based on the channel information includes acquiring the inter-group PMI based on the channel information and a preconfigured inter-group codebook, and acquiring the RI and the CQI based on the channel information.

In another aspect, the present disclosure provides in some embodiments a base station, including: a division module configured to divide a plurality of antenna ports into a plurality of groups of antenna ports; a configuration module configured to configure for each group of antenna ports a same intra-group codebook set consisting of a plurality of intra-group precoding matrices, allocate for each group of antenna ports a plurality of different reference signals corresponding to a same reference resource, and configure for each antenna port in each group of antenna ports a precoded reference signal acquired after a precoding operation using the intra-group precoding matrices, a number of the reference resources corresponding to a number of the intra-group precoding matrices in the intra-group codebook set, and a number of the reference signals corresponding to each reference resource corresponding to a number of groups of inter-group antenna ports; a first transmission module configured to transmit the precoded reference signal to a User Equipment (UE) via each antenna port; and a first reception module configured to receive Chanel State Information (CSI) fed back by the UE based on measurement on the reference signal.

In a possible embodiment of the present disclosure, the division module is further configured to divide, in a row-based or column-based manner, the plurality of antenna ports into the plurality of groups of antenna ports based on one dimension of the antenna ports using a same grouping mode.

In a possible embodiment of the present disclosure, the reference resource is a CSI-RS resource, and the reference signal is a CSI-RS. The number of the CSI-RS resources is the same as the number of the intra-group precoding matrices in the intra-group codebook set, and the number of the CSI-RSs corresponding to each CSI-RS resource is the same as the number of the inter-group antenna ports. The CSI-RSs corresponding to a same CSI-RS resource allocated for each group of antenna ports are precoded with a same intra-group precoding matrix so as to form beams in a same direction, the CSI-RSs corresponding to different CSI-RS resources allocated for a same group of antenna port are precoded with different intra-group precoding matrices so as to form beams in different directions, and the beams formed by the different intra-group precoding matrices evenly cover an entire angular range in a vertical direction.

In a possible embodiment of the present disclosure, the first transmission module is further configured to: when the CSI-RS resource is a frequency-domain resource, transmit the precoded reference signal to the UE via each antenna port within a same subframe; or when the CSI-RS resource is a time-domain resource, transmit the precoded reference signal to the UE via each antenna port within different subframes.

In yet another aspect, the present disclosure provides in some embodiments a base station, including: a processor; and a memory connected to the processor via a bus interface and configured to store therein programs and data for the operation of the processor. The processor is configured to call and execute the programs and data stored in the memory, so as to implement: a division module for dividing a plurality of antenna ports into a plurality of groups of antenna ports; a configuration module for configuring for each group of antenna ports a same intra-group codebook set consisting of a plurality of intra-group precoding matrices, allocating for each group of antenna ports a plurality of different reference signals corresponding to a same reference resource, and configuring for each antenna port in each group of antenna ports a precoded reference signal acquired after a precoding operation using the intra-group precoding matrices, a number of the reference resources corresponding to a number of the intra-group precoding matrices in the intra-group codebook set, and a number of the reference signals corresponding to each reference resource corresponding to a number of groups of inter-group antenna ports; a first transmission module for transmitting the precoded reference signal to a User Equipment (UE) via each antenna port; and a first reception module for receiving Channel State Information (CSI) fed back by the UE based on measurement on the reference signal.

In still yet another aspect, the present disclosure provides in some embodiments a method for feeding back CSI, including steps of: receiving reference signals corresponding to a plurality of reference resources from a base station, the reference signal being configured by the base station for each group of a plurality of groups of antenna ports, each group of antenna ports being configured by the base station with a same intra-group codebook set consisting of a plurality of intra-group precoding matrices, a plurality of different reference signals corresponding to a same reference resource being configured by the base station for each group of antenna ports, each antenna port in each group of antenna ports being configured by the base station with a precoded reference signal acquired after a precoding operation using the intra-group precoding matrices, a number of the reference resources corresponding to a number of the intra-group precoding matrices in the intra-group codebook set, and a number of the reference signals corresponding to each reference resource corresponding to a number of groups of inter-group antenna ports; measuring each reference signal corresponding to the reference resource so as to acquire the CSI; and transmitting the acquired CSI to the base station.

In a possible embodiment of the present disclosure, the step of measuring each reference signal corresponding to the reference resource so as to acquire the CSI includes: measuring the reference signals corresponding to the reference resources respectively, so as to acquire intra-group precoding matrix indicators (PMIs) to be fed back to the base station; acquiring channel information about each reference signal corresponding to the reference resource corresponding to each intra-group PMI on each group of antenna ports; acquiring an inter-group PMI, a rank indicator (RI) and a channel quality indicator (CQI) to be fed back to the base station based on the channel information; and taking the intra-group PMI, the inter-group PMI, the RI and the CQI as the CSI.

In a possible embodiment of the present disclosure, the step of measuring the reference signals corresponding to the reference resources respectively so as to acquire the intra-group PMIs to be fed back to the base station includes: calculating average values of Reference Signal Received Power (RSRP) of the reference signals corresponding to each reference resource on all the groups of antenna ports; and acquiring a PMI corresponding to the RSRP having a largest average value, and taking the PMI as the intra-group PMI.

In a possible embodiment of the present disclosure, the step of acquiring the channel information about the reference signals corresponding to the reference resources corresponding to the intra-group PMIs on each group of antenna ports comprises performing channel measurement on the reference signals corresponding to the reference resources corresponding to the intra-group PMIs on all the groups of antenna ports, so as to acquire the channel information corresponding to each group of antenna ports.

In a possible embodiment of the present disclosure, the step of acquiring the inter-group PMI, the RI and the CQI to be fed back to the base station based on the channel information includes: acquiring the inter-group PMI based on the channel information and a preconfigured inter-group codebook set; and acquiring the RI and the CQI based on the channel information.

In a possible embodiment of the present disclosure, the reference resource is a CSI-RS resource, and the reference signal is a CSI-RS. The a number of the CSI-RS resources is the same as a number of the intra-group precoding matrices in the intra-group codebook set, and a number of the CSI-RSs corresponding to each CSI-RS resource is the same as a number of groups of the inter-group antenna ports; and the CSI-RSs corresponding to a same CSI-RS resource allocated for each group of antenna ports are precoded with a same intra-group precoding matrix so as to form beams in a same direction, the CSI-RSs corresponding to different CSI-RS resources allocated for a same group of antenna port are precoded with different intra-group precoding matrices so as to form beams in different directions, and the beams formed by the different intra-group precoding matrices evenly cover an entire angular range in a vertical direction.

In still yet another aspect, the present disclosure provides in some embodiments a UE, including: a second reception module configured to receive reference signals corresponding to a plurality of reference resources from a base station, the reference signal being configured by the base station for each group of a plurality of groups of antenna ports, each group of antenna ports being configured by the base station with a same intra-group codebook set consisting of a plurality of intra-group precoding matrices, a plurality of different reference signals corresponding to a same reference resource being configured by the base station for each group of antenna ports, each antenna port in each group of antenna ports being configured by the base station with a precoded reference signal acquired after a precoding operation using the intra-group precoding matrices, a number of the reference resources corresponding to a number of the intra-group precoding matrices in the intra-group codebook set, and a number of the reference signals corresponding to each reference resource corresponding to a number of groups of inter-group antenna ports; an acquisition module configured to measure each reference signal corresponding to the reference resource so as to acquire Channel State Information (CSI); and a second transmission module configured to transmit the acquired CSI to the base station.

In a possible embodiment of the present disclosure, the acquisition module includes: a first acquisition sub-module configured to measure the reference signals corresponding to the reference resources respectively, so as to acquire intra-group precoding matrix indicators (PMIs) to be fed back to the base station; a second acquisition sub-module configured to acquire channel information about each reference signal corresponding to the reference resource corresponding to each intra-group PMI on each group of antenna ports; and a third acquisition sub-module configured to acquire an inter-group PMI, a rank indicator (RI) and a channel quality indicator (CQI) to be fed back to the base station based on the channel information, and take the intra-group PMI, the inter-group PMI, the RI and the CQI as the CSI.

In a possible embodiment of the present disclosure, the first acquisition sub-module includes: a calculation unit configured to calculate average values of RSRP of the reference signals corresponding to each reference resource on all the groups of antenna ports; and a first acquisition unit configured to acquire a PMI corresponding to the RSRP having the largest average value, and take the PMI as the intra-group PMI.

In a possible embodiment of the present disclosure, the third acquisition sub-module includes: a second acquisition unit configured to acquire the inter-group PMI based on the channel information and a preconfigured inter-group codebook set; and a third acquisition unit configured to acquire the RI and the CQI based on the channel information.

In still yet another aspect, the present disclosure provides in some embodiments a UE, including: a processor; and a memory connected to the processor via a bus interface and configured to store therein programs and data for the operation of the processor. The processor is configured to call and execute the programs and data stored in the memory, so as to so as to implement: a second reception module for receiving reference signals corresponding to a plurality of reference resources from a base station, the reference signal being configured by the base station for each group of a plurality of groups of antenna ports, each group of antenna ports being configured by the base station with a same intra-group codebook set consisting of a plurality of intra-group precoding matrices, a plurality of different reference signals corresponding to a same reference resource being configured by the base station for each group of antenna ports, each antenna port in each group of antenna ports being configured by the base station with a precoded reference signal acquired after a precoding operation using the intra-group precoding matrices, a number of the reference resources corresponding to a number of the intra-group precoding matrices in the intra-group codebook set, and a number of the reference signals corresponding to each reference resource corresponding to a number of groups of inter-group antenna ports; an acquisition module for measuring each reference signal corresponding to the reference resource so as to acquire Channel State Information (CSI); and a second transmission module for transmitting the acquired CSI to the base station.

According to the embodiments of the present disclosure, the antenna ports of the base station are divided into the plurality of groups of antenna ports, the reference signals corresponding to the reference resources in each group of antenna ports are beamformed, and the reference signals corresponding to the reference resources between the groups of antenna ports are not beamformed. In other words, the reference signals are transmitted in both an inter-group non-beamforming mode and an intra-group beamforming mode, so as to solve the problem in the related art where the reference signal is of an inadequate coverage range or angular range when the reference signal is transmitted in a single way. Through the above configuration, it is able to transmit the reference signals corresponding to the reference resources in a more appropriate manner, thereby to ensure the coverage range and the angular range of the reference signals.

DETAILED DESCRIPTION OF THE EMBODIMENTS

In order to make the objects, the technical solutions and the advantages of the present disclosure more apparent, the present disclosure will be described hereinafter in conjunction with the drawings and embodiments.

For a conventional method for feeding back CSI, reference signals are transmitted in an inappropriate manner, so the inaccurate CSI may be fed back by a UE and the system performance may be adversely affected. An object of the present disclosure is to provide a method for feeding back CSI, a base station and a UE, so as to ensure a coverage range and an angular range of the reference signal.

First Embodiment

Figure 1:
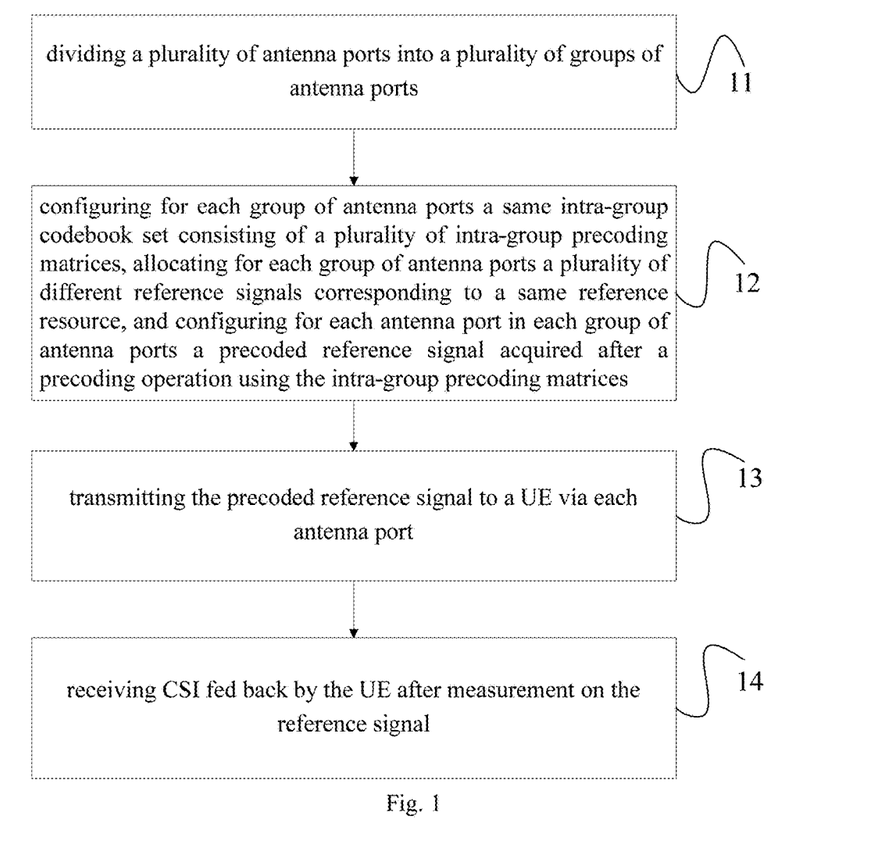
FIG. 1 is a flow chart of a method for feeding back CSI according to the first embodiment of the present disclosure.

As shown in FIG. 1, the present disclosure provides in this embodiment a method for feeding back CSI, which includes the following steps.

Step 11: dividing a plurality of antenna ports into a plurality of groups of antenna ports. It should be appreciated that, a base station is provided with a plurality of antenna ports for transmitting/receiving signals, and these antenna ports are divided into groups for management, i.e., each group of antenna ports may be considered as a large antenna port. In this way, it is able to reduce the number of the antenna ports, thereby to reduce the number of signals to be transmitted to a UE.

Step 12: configuring for each group of antenna ports a same intra-group codebook set consisting of a plurality of intra-group precoding matrices, allocating for each group of antenna ports a plurality of different reference signals corresponding to a same reference resource, and configuring for each antenna port in each group of antenna ports a precoded reference signal acquired after a precoding operation using the intra-group precoding matrices. The number of the reference resources is the same as the number of the intra-group precoding matrices in the intra-group codebook set, and the number of the reference signals corresponding to each reference resource is the same as the number of groups of inter-group antenna ports.

It should be appreciated that, a plurality of reference sources are to be transmitted from the base station, so when configuring the reference resources, it is necessary to configure one reference signal for each reference resource with respect to each group of antenna ports, and the reference signal to be transmitted in an inter-group mode may not be beamformed, i.e., the reference signal is configured in an inter-group non-beamforming mode. In addition, it is necessary to transmit one reference signal corresponding to the plurality of reference resources with respect to each group of antenna ports, and the reference signal to be transmitted in an intra-group mode may be beamformed, i.e., the reference signal is configured in an intra-group beamforming mode. In this way, the reference signals are transmitted in both the inter-group non-beamforming mode and the intra-group beamforming mode, so as to provide the reference signals transmitted via the antenna ports with a better coverage range and a better angular range as possible.

Step 13: transmitting the precoded reference signal to the UE via each antenna port. In this step, it is merely necessary to transmit the reference resources based on the configuration in Step 12. It should be appreciated that, one reference signal needs to be transmitted via a plurality of antenna ports in each group of antenna ports, so a precoded reference signal of the reference signal is transmitted via one antenna port in each group of antenna ports. However, the UE may receive the precoded reference signal as the reference signal, that is the UE receives the reference signal from each group of antenna ports.

Step 14: receiving the CSI fed back by the UE after measurement on the reference signal.

It should be appreciated that, the method for feeding back the CSI is for use at a base station side.

In this embodiment, the reference resource is a CSI-RS resource, and the reference signal is a CSI-RS. The number of the CSI-RS resources is the same as the number of the intra-group precoding matrices in the intra-group codebook set, and the number of the CSI-RSs corresponding to each CSI-RS resource is the same as the group number of the inter-group antenna ports. The CSI-RSs corresponding to a same CSI-RS resource allocated for each group of antenna ports are precoded with a same intra-group precoding matrix so as to form beams in a same direction, the CSI-RSs corresponding to different CSI-RS resources allocated for a same group of antenna port are precoded with different intra-group precoding matrices so as to form beams in different directions, and the beams formed by the different intra-group precoding matrices evenly cover an entire angular range in the vertical direction.

It should be appreciated that, the CSI-RS is transmitted via each group of antenna port, so the base station may configure one CSI-RS corresponding to one CSI-RS resource for each group of antenna ports. It should be appreciated that, a plurality of CSI-RS resources may be transmitted from the base station to the UE, and at this time, the base station may configure one CSI-RS corresponding to one CSI-RS resource for each group of antenna ports. If there are Q CSI-RS resources to be transmitted, Q CSI-RSs may be transmitted via each group of antenna ports, and the CSI-RSs transmitted via a same group of antenna ports may have different beamforming directions. Through this configuration, it is able to configure a same beamforming for a same CSI-RS resource to be transmitted via the groups of antenna ports, and configure different beamforming for different CSI-RS resources.

The CSI-RS resources may include frequency-domain resources or time-domain resources. It should be appreciated that, when the CSI-RS resources are frequency-domain resources, the base station may transmit the precoded reference signal of the reference signal to the UE via the antenna ports within a same subframe based on the above-mentioned configuration. When the CSI-RS resources are time-domain resources, the base station may transmit the precoded reference signal of the reference signal to the UE via the antenna ports within different subframes based on the above-mentioned configuration.

It should be further appreciated that, usually upon the receipt of the CSI-RSs corresponding to the plurality of CSI-RS resources from the base station via the plurality of groups of antenna ports, the UE needs to feed back the CSI corresponding to an optimum CSI-RS resource to the base station based on the received CSI-RSs corresponding to the plurality of CSI-RS resources. In this embodiment, the CSI usually includes, but not limited to, an intra-group PMI, an inter-group CMI, a RI and a CQI.

In a possible embodiment of the present disclosure, the method may further include: measuring, by the UE, the reference signal corresponding to each reference resource, so as to acquire the intra-group PMI to be fed back to a base station; acquiring channel information about the reference signal corresponding to the reference resource corresponding to the intra-group PMI on each group of antenna ports; acquiring the inter-group PMI, the RI and the CQI fed back to the base station based on the channel information; and taking the intra-group PMI, the inter-group PMI, the RI and the CQI as the CSI.

It should be appreciated that, the UE may acquire the CSI to be fed back to the base station as mentioned above.

In a possible embodiment of the present disclosure, the step of measuring, by the UE, the reference signal corresponding to each reference resource so as to acquire an intra-group PMI to be fed back to a base station includes calculating average values of Reference Signal Received Power (RSRP) of the reference signals corresponding to each reference resource on all the groups of antenna ports respectively, acquiring a PMI corresponding to the largest average value of the RSRP, and taking the PMI as the intra-group PMI.

The step of acquiring the channel information about the reference signal corresponding to the reference resource corresponding to the intra-group PMI on each group of antenna ports includes performing channel measurement on the reference signals corresponding to the reference resources corresponding to the intra-group PMIs on all the groups of antenna ports, so as to acquire the channel information corresponding to each group of antenna ports.

The step of acquiring the inter-group PMI, the RI and the CQI fed back to the base station based on the channel information includes acquiring the inter-group PMI based on the channel information and a preconfigured inter-group codebook, and acquiring the RI and the CQI based on the channel information.

It should be appreciated that, upon the receipt of the CSI from the UE, the base station may calculate a 3D precoding matrix based on the intra-group PMI and the inter-group PMI contained in the CSI, and perform link adaptation calculation based on the 3D precoding matrix and the RI and the CQI contained in the CSI.

According to the method in this embodiment of the present disclosure, the antenna ports of the base station are divided into the plurality of groups of antenna ports, the reference signals corresponding to the reference resources in each group of antenna ports are beamformed, and the reference signals corresponding to the reference resources between the groups of antenna ports are not beamformed. In other words, the reference signals are transmitted in both an inter-group non-beamforming mode and an intra-group beamforming mode, so as to solve the problem in the related art where the reference signal is of an inadequate coverage range or angular range when the reference signal is transmitted in a single way. Through the above configuration, it is able to transmit the reference signals corresponding to the reference resources in a more appropriate manner, thereby to ensure the coverage range and the angular range of the reference signals. In addition, one reference signal is transmitted via each group of antenna ports, so it is able to reduce the number of the reference signals to be transmitted, save the channel resources and improve the system efficiency.

Second Embodiment

Figure 2:
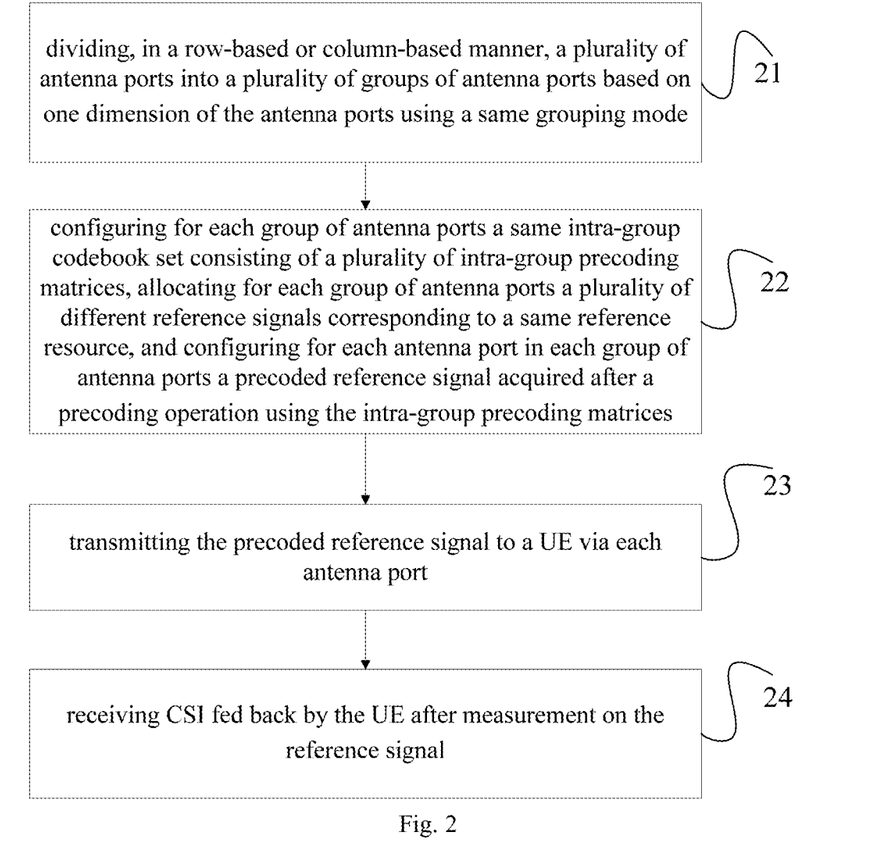
FIG. 2 is a flow chart of a method for feeding back CSI according to the second embodiment of the present disclosure.

As shown in FIG. 2, the present disclosure provides in this embodiment a method for feeding back CSI, which includes the following steps.

Step 21: dividing, in a row-based or column-based manner, a plurality of antenna ports into a plurality of groups of antenna ports based on one dimension of the antenna ports using a same grouping mode.

It should be appreciated that, usually the antenna ports of the base station include antenna ports in a vertical direction and antenna ports in a horizontal direction. In this embodiment, usually the antenna ports are divided in merely one direction, so as to facilitate the management and configuration of the divided antenna ports.

Step 22: configuring for each group of antenna ports a same intra-group codebook set consisting of a plurality of intra-group precoding matrices, allocating for each group of antenna ports a plurality of different reference signals corresponding to a same reference resource, and configuring for each antenna port in each group of antenna ports a precoded reference signal acquired after a precoding operation using the intra-group precoding matrices. The number of the reference resources is the same as the number of the intra-group precoding matrices in the intra-group codebook set, and the number of the reference signals corresponding to each reference resource is same as the number of groups of inter-group antenna ports.

Step 23: transmitting the precoded reference signal to a UE via each antenna port.

Step 24: receiving the CSI fed back by the UE after measurement on the reference signal.

It should be appreciated that, when dividing the plurality of antenna ports based on a vertical dimension of the antenna ports, Step 21 may include Step 211 of dividing every M antenna ports in each column of antenna ports in a vertical direction into one group, each column of antenna ports being divided into a same number of groups, and M representing the predetermined number of antenna ports in each group.

In actual use, in order to enable the signal from each antenna port to be adjustable in the vertical direction, usually the antenna ports are divided in the vertical direction rather than the horizontal direction. In this way, it is able to reduce the number of the signals to be transmitted while ensuring the coverage range and the angular range of the signal, thereby to save the channel resources.

To be specific, during the configuration, the method may include the following steps.

S11: dividing N ($N=N_H \times N_V$) antenna ports of a massive MIMO antenna into P groups, i.e., maintaining $N_H$ antenna ports in the horizontal direction unchanged, and dividing every M antenna ports of $N_V$ antenna ports in each column in the vertical direction into one group so as to acquire Z groups of antenna ports in each column, thereby to acquire the P groups of antenna ports ($P=N_H \times Z$). In other words, the P groups of antenna ports include $N_H$ antenna ports in the horizontal direction and Z antenna ports in the vertical direction, and each group of antenna ports include M antenna ports. $N_V$ represents the number of antenna ports in the vertical direction in each column, and $N_H$ represents the number of antenna ports in the horizontal direction in each row.

S12: configuring Q CSI-RS resources, each CSI-RS resource corresponding to P CSI-RSs. It should be appreciated that, the Q CSI-RS resources may be frequency-domain resources or time-domain resources.

S13: configuring one CSI-RS corresponding to one CSI-RS resource for each group of the P groups of antenna ports, and configuring same Q CSI-RS resources for each group of the P groups of antenna ports.

S14: enabling the Q CSI-RSs corresponding to the Q CSI-RS resources in a same group to correspond to Q beams in different direction within an angular range, the Q beams in different directions being formed by the M antenna ports in each group through the intra-group PMIs.

S15: configuring, by the base station, an M*Q intra-group codebook (i.e., $W_{codebook}^{intra}$). The $W_{codebook}^{intra}$ codebook includes Q M*1-dimension intra-group PMIs (i.e., $w^{intra}$), and the corresponding PMIs are intra-group PMIs (i.e., $PMI^{intra}$).

S16: configuring, by the base station, a P*NFFT inter-group codebook (i.e., $W_{codebook}^{inter}$). The codebook includes NFFT $N_H \times Z$-dimension inter-group PMIs (i.e., $w^{inter}$), and the corresponding PMIs are intra-group PMIs (i.e., $PMI^{inter}$). Usually, NFFT has a value of 32.

During the transmission, the method may include transmitting, by the base station, the Q CSI-RS resources to the UE based on types of the CSI-RS resources, each CSI-RS resource includes the CSI-RSs to be transmitted via the P groups of antenna ports. To be specific, if the Q CSI-RS resources are frequency-domain resources, the Q CSI-RS resources may be transmitted within a same subframe. If the Q CSI-RS resources are time-domain resources, they may be transmitted within different subframes.

Figure 3:
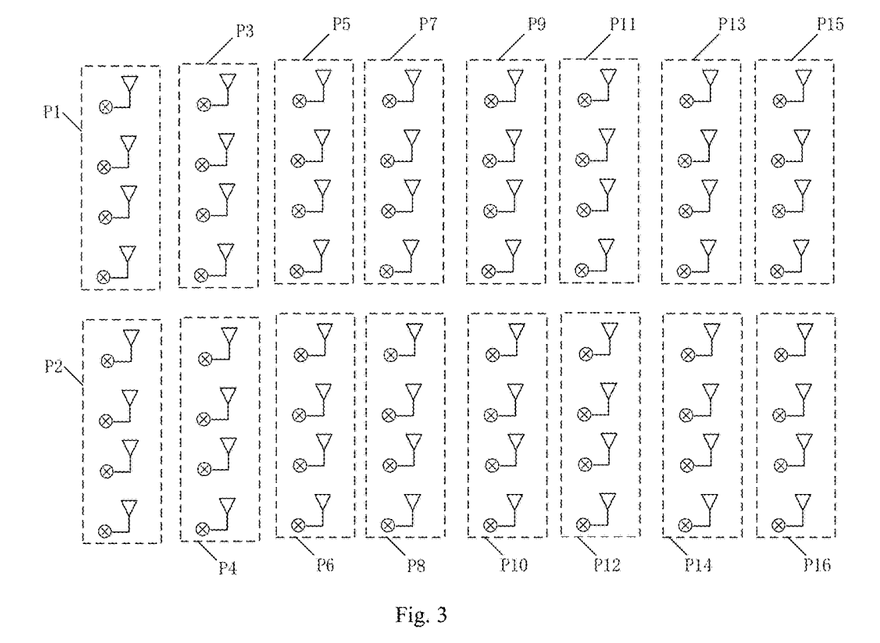
FIG. 3 is a schematic view showing a grouping state of antenna ports.

As shown in FIG. 3, taking the base station with 64 (8*8) antenna ports as an example, i.e., 8 antenna ports in each column in the vertical direction and 8 antenna ports in each row in the horizontal direction, every four antenna ports in each column are grouped into one group. In other words, the antenna ports in each column are divided into two groups, there are totally 16 groups for 64 antenna ports, i.e., P1, P2, . . . , P16 in FIG. 3.

Each group of antenna ports are configured to carry the CSI-RSs corresponding to the plurality of CSI-RS resources, and merely carry one CSI-RS corresponding to each CSI-RS resource.

For example, if two time-domain CSI-RS resources are to be transmitted, each CSI-RS resource may be divided into 16 CSI-RSs, and each group of the P groups of antenna ports may carry one CSI-RS corresponding to each CSI-RS resource, i.e., one CSI-RS corresponding to each CSI-RS resource may be transmitted via the corresponding group of antenna ports carrying the CSI-RS.

For example, the group P1 of antenna ports may carry a CSI-RS 1 corresponding to a first CSI-RS resource and a CSI-RS 1 corresponding to a second CSI-RS resource, the group P2 of antenna ports may carry a CSI-RS 2 corresponding to the first CSI-RS resource and a CSI-RS 2 corresponding to the second CSI-RS resource, and so on. The first CSI-RS resource corresponds to the CSI-RSs S101, S102, . . . , and S116. The second CSI-RS resource corresponds to the CSI-RSs S201, S202, . . . , and S216. The first CSI-RS resource and the second CSI-RS resource are transmitted within different subframes. To be specific, S101 and S201 are transmitted via the group P1 of antenna ports, S102 and S202 are transmitted via the group P2 of antenna ports, and so on.

According to the method in this embodiment of the present disclosure, the antenna ports of the base station are divided into the plurality of groups of antenna ports, the reference signals corresponding to the reference resources in each group of antenna ports are beamformed, and the reference signals corresponding to the reference resources between the groups of antenna ports are not beamformed. In other words, the reference signals are transmitted in both an inter-group non-beamforming mode and an intra-group beamforming mode, so as to solve the problem in the related art where the reference signal is of an inadequate coverage range or angular range when the reference signal is transmitted in a single way. Through the above configuration, it is able to transmit the CSI-RS corresponding to the CSI-RS resources in a more appropriate manner, thereby to ensure the coverage range and the angular range of the CSI-RSs. In addition, one CSI-RS is transmitted via each group of antenna ports, so it is able to reduce the number of the CSI-RSs to be transmitted, save the channel resources and improve the system efficiency.

Third Embodiment

Figure 4:
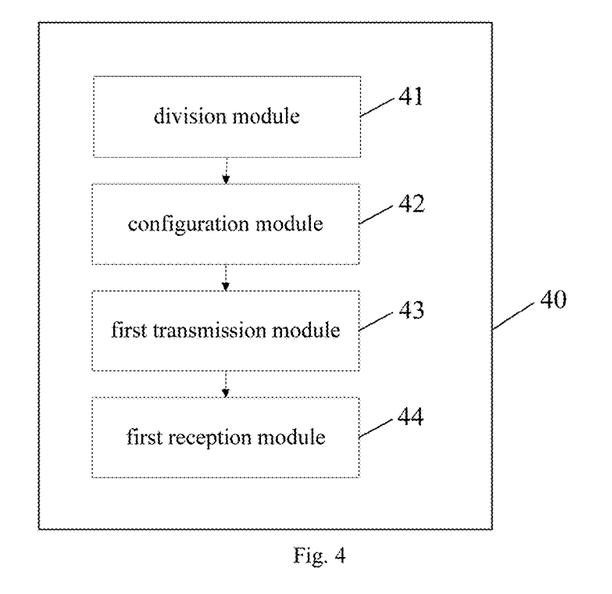
FIG. 4 is a schematic module view showing a base station according to the third embodiment of the present disclosure.

As shown in FIG. 4, the present disclosure provides in this embodiment a base station 40, which includes: a division module 41 configured to divide a plurality of antenna ports into a plurality of groups of antenna ports; a configuration module 42 configured to configure for each group of antenna ports a same intra-group codebook set consisting of a plurality of intra-group precoding matrices, allocate for each group of antenna ports a plurality of different reference signals corresponding to a same reference resource, and configure for each antenna port in each group of antenna ports a precoded reference signal acquired after a precoding operation using the intra-group precoding matrices, the number of the reference resources being the same as the number of the intra-group precoding matrices in the intra-group codebook set, and the number of the reference signals corresponding to each reference resource being the same as the number of groups of inter-group antenna ports; a first transmission module 43 configured to transmit the precoded reference signal to a UE via each antenna port; and a first reception module 44 configured to receive CSI fed back by the UE after measurement on the reference signal.

In a possible embodiment of the present disclosure, the division module 41 is further configured to divide, in a row-based or column-based manner, the plurality of antenna ports into the plurality of groups of antenna ports based on one dimension of the antenna ports using a same grouping mode.

In a possible embodiment of the present disclosure, when dividing the plurality of antenna ports based on a vertical dimension of the antenna ports, the division module 51 is further configured to divide every M antenna ports in each column of antenna ports in a vertical direction into one group, each column of antenna ports being divided into a same number of groups, and M representing the predetermined number of antenna ports in each group.

In a possible embodiment of the present disclosure, the reference resource is a CSI-RS resource, and the reference signal is a CSI-RS. The number of the CSI-RS resources is the same as the number of the intra-group precoding matrices in the intra-group codebook set, and the number of the CSI-RSs corresponding to each CSI-RS resource is the same as the number of the groups of the inter-group antenna ports. The CSI-RSs corresponding to a same CSI-RS resource allocated for each group of antenna ports are precoded with a same intra-group precoding matrix so as to form beams in a same direction, the CSI-RSs corresponding to different CSI-RS resources allocated for a same group of antenna port are precoded with different intra-group precoding matrices so as to form beams in different directions, and the beams formed by the different intra-group precoding matrices evenly cover an entire angular range in the vertical direction.

In a possible embodiment of the present disclosure, the first transmission module 43 is further configured to: when the CSI-RS resource is a frequency-domain resource, transmit the precoded reference signal to the UE via each antenna port within a same subframe; or when the CSI-RS resource is a time-domain resource, transmit the precoded reference signal to the UE via each antenna port within different subframes.

It should be appreciated that, the CSI may be acquired as follows. The UE may measure the reference signal corresponding to each reference resource so as to acquire an intra-group PMI to be fed back to the base station, acquire channel information about the reference signal corresponding to the reference resource corresponding to the intra-group PMI on each group of antenna ports, acquire an inter-group PMI, a RI and a CQI fed back to the base station based on the channel information, and take the intra-group PMI, the inter-group PMI, the RI and the CQI as the CSI.

To be specific, when measuring the reference signal corresponding to each reference resource so as to acquire the intra-group PMI to be fed back to the base station, the UE may calculate average values of RSRP of the reference signals corresponding to each reference resource on all the groups of antenna ports respectively, acquire a PMI corresponding to the largest average value of the RSRP, and take the PMI as the intra-group PMI.

To be specific, when acquiring the channel information about the reference signal corresponding to the reference resource corresponding to the intra-group PMI on each group of antenna ports, the UE may perform channel measurement on the reference signals corresponding to the reference resources corresponding to the intra-group PMIs on all the groups of antenna ports so as to acquire the channel information corresponding to each group of antenna ports.

To be specific, when acquiring the inter-group PMI, the RI and the CQI fed back to the base station based on the channel information, the UE may acquire the inter-group PMI based on the channel information and a preconfigured inter-group codebook, and acquire the RI and the CQI based on the channel information.

It should be appreciated that, the implementation of the base station may refer to that of the above-mentioned method, with a same technical effect.

Fourth Embodiment

Figure 5:
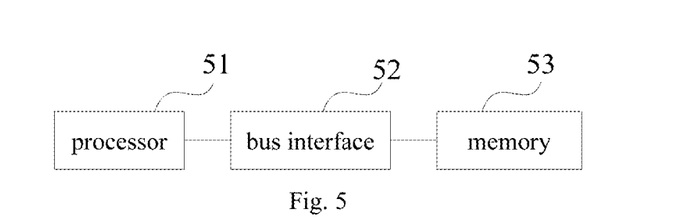
FIG. 5 is a schematic structure view showing a base station according to the fourth embodiment of the present disclosure.

As shown in FIG. 5, the present disclosure provides in this embodiment a base station, which includes: a processor 51; and a memory 53 connected to the processor 51 via a bus interface 52 and configured to store therein programs and data for the operation of the processor 51. The processor 51 is configured to call and execute the programs and data stored in the memory 53, so as to implement the following functional modules: a division module for dividing a plurality of antenna ports into a plurality of groups of antenna ports; a configuration module for configuring for each group of antenna ports a same intra-group codebook set consisting of a plurality of intra-group precoding matrices, allocating for each group of antenna ports a plurality of different reference signals corresponding to a same reference resource, and configuring for each antenna port in each group of antenna ports a precoded reference signal acquired after a precoding operation using the intra-group precoding matrices, the number of the reference resources being the same as the number of the intra-group precoding matrices in the intra-group codebook set, and the number of the reference signals corresponding to each reference resource being the same as the number of groups of inter-group antenna ports; a first transmission module for transmitting the precoded reference signal to a UE via each antenna port; and a first reception module for receiving CSI fed back by the UE after measurement on the reference signal.

The processor 51 may be further configured to achieve the function of any other module of the base station.

It should be appreciated that, all or parts of the above-mentioned steps may be implemented through hardware or a computer program. The computer program includes instructions for executing parts of or all of the steps in the above-mentioned method. In addition, the computer program may be stored in a computer-readable storage medium in any form.

Fifth Embodiment

Figure 6:
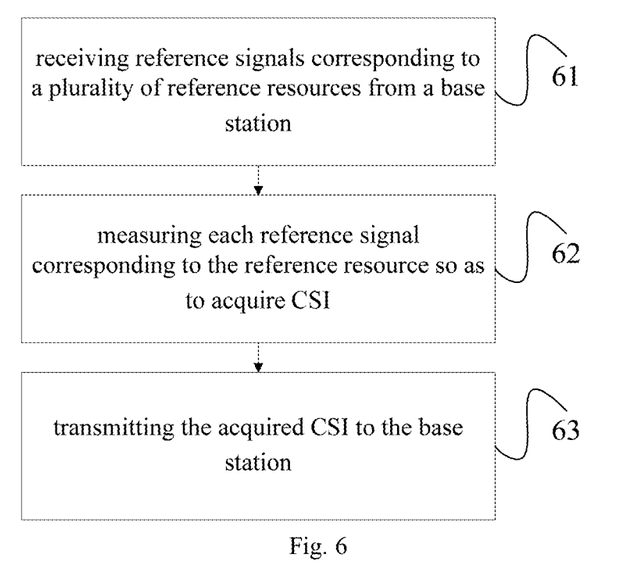
FIG. 6 is a flow chart of a method for feeding back CSI according to the fifth embodiment of the present disclosure.

As shown in FIG. 6, the present disclosure provides in this embodiment a method for feeding back CSI, which includes the following steps.

Step 61: receiving reference signals corresponding to a plurality of reference resources from a base station.

It should be appreciated that, the reference signal is configured by the base station for each group of a plurality of groups of antenna ports, each group of antenna ports is configured by the base station with a same intra-group codebook set consisting of a plurality of intra-group precoding matrices, a plurality of different reference signals corresponding to a same reference resource is configured by the base station for each group of antenna ports, and each antenna port in each group of antenna ports is configured by the base station with a precoded reference signal acquired after a precoding operation using the intra-group precoding matrices. The number of the reference resources is the same as the number of the intra-group precoding matrices in the intra-group codebook set, and the number of the reference signals corresponding to each reference resource is the same as the number of groups of inter-group antenna ports.

In a possible embodiment of the present disclosure, the reference resource is a CSI-RS resource from the base station, and the reference signal is a CSI-RS. The number of the CSI-RS resources is same as the number of the intra-group precoding matrices in the intra-group codebook set, and the number of the CSI-RSs corresponding to each CSI-RS resource is same as the number of the inter-group antenna ports. The CSI-RSs corresponding to a same CSI-RS resource allocated for each group of antenna ports are precoded with a same intra-group precoding matrix so as to form beams in a same direction, the CSI-RSs corresponding to different CSI-RS resources allocated for a same group of antenna port are precoded with different intra-group precoding matrices so as to form beams in different directions, and the beams formed by the different intra-group precoding matrices evenly cover an entire angular range in the vertical direction.

Step 62: measuring each reference signal corresponding to the reference resource so as to acquire the CSI.

It should be appreciated that, usually the reference resource is the CSI-RS resource from the base station, and the reference signal is the CSI-RS. The UE may select the reference resource and perform the channel measurement based on the CSI-RSs corresponding to the CSI-RS resources, so as to acquire the CSI to be fed back to the base station.

Step 63: transmitting the acquired CSI to the base station.

It should be appreciated that, the method may be used at a UE side. The UE may receive the CSI-RSs corresponding to the CSI-RS resources from the base station via the groups of antenna ports. The CSI-RSs is received by the groups of antenna ports, so it is able to reduce the number of the CSI-RS received by the UE, reduce a processing delay for the CSI-RSs at the UE side, and improve the feedback efficiency.

Sixth Embodiment

Figure 7:
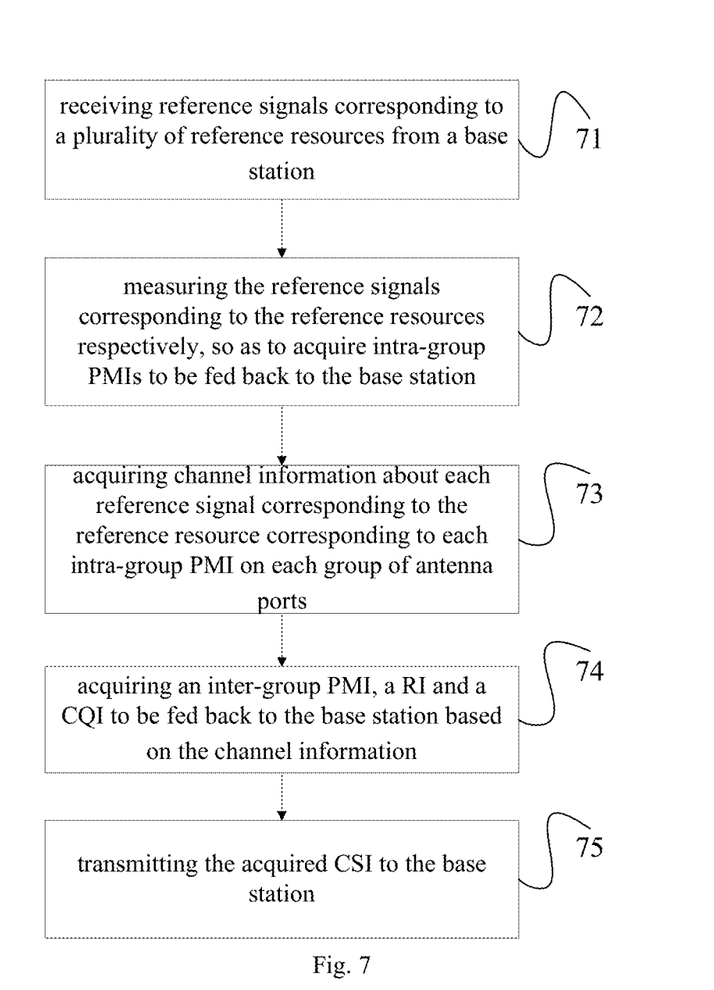
FIG. 7 is a flow chart of a method for feeding back CSI according to the sixth embodiment of the present disclosure.

As shown in FIG. 7, the present disclosure provides in this embodiment a method for feeding back CSI, which includes the following steps.

Step 71: receiving reference signals corresponding to a plurality of reference resources from a base station.

The reference signal is configured by the base station for each group of a plurality of groups of antenna ports, each group of antenna ports is configured by the base station with a same intra-group codebook set consisting of a plurality of intra-group precoding matrices, a plurality of different reference signals corresponding to a same reference resource is configured by the base station for each group of antenna ports, and each antenna port in each group of antenna ports is configured by the base station with a precoded reference signal acquired after a precoding operation using the intra-group precoding matrices. The number of the reference resources is the same as the number of the intra-group precoding matrices in the intra-group codebook set, and the number of the reference signals corresponding to each reference resource is the same as the number of groups of inter-group antenna ports.

Step 72: measuring the reference signals corresponding to the reference resources respectively, so as to acquire intra-group PMIs to be fed back to the base station.

In Step 72, upon the receipt of the reference signal corresponding to the reference resource, it is necessary to acquire an optimum beam based on the reference signal. The beam is generated based on the intra-group PMI, so in Step 72, the intra-group PMI to be fed back may be acquired based on the acquired reference signal corresponding to the reference resource.

Step 73: acquiring channel information about each reference signal corresponding to the reference resource corresponding to each intra-group PMI on each group of antenna ports.

Upon the receipt of the intra-group PMI to be fed back, it is able to know the reference resource to which the intra-group PMI corresponds. Then, it is able to perform the channel measurement on the resource, so as to acquire the corresponding channel information.

Step 74: acquiring an inter-group PMI, a RI and a CQI to be fed back to the base station based on the channel information.

It should be appreciated that, the intra-group PMI, the inter-group PMI, the RI and the CQI may be taken as the CSI and fed back to the base station.

Step 75: transmitting the acquired CSI to the base station.

It should be appreciated that, the reference resource is configured and transmitted in two stages at the base station side, so the CSI may be acquired at the UE side in two stages too. In other words, the intra-group PMI may be acquired at first so as to determine the reference resource, and then the channel measurement may be performed on the reference resource so as to generate information included in the CSI to be fed back.

In a possible embodiment of the present disclosure, Step 72 may include the following steps.

Step 721: calculating average values of RSRP of the reference signals corresponding to each reference resource on all the groups of antenna ports.

When the CSI-RS resource is transmitted from the base station to the UE, the CSI-RS signal corresponding to each CSI-RS resource transmitted via each group of antenna ports may be provided with a RSRP value. At this time, the average value of the RSRP values of the CSI-RSs corresponding to a same CSI-RS resource may be calculated (e.g., as shown in FIG. 3, an average value of the RSRP of the first CSI-RS resource may be calculated based on S101, S102, . . . , and S116, and an average value of the RSRP of the second CSI-RS resource may be calculated based on S201, S202, . . . , and S216.

Step 722: acquiring a PMI corresponding to the RSRP having a largest average value, and taking the PMI as the intra-group PMI.

When the average value of the RSRP of a certain CSI-RS resource is the largest, it means that the CSI-RS resource has the best received power. At this time, the PMI for beamforming the CSI-RS resource may be selected as the intra-group PMI to be fed back.

In a possible embodiment of the present disclosure, Step 73 may include Step 731 of performing channel measurement on the reference signals corresponding to the reference resources corresponding to the intra-group PMIs on all the groups of antenna ports, so as to acquire the channel information corresponding to each group of antenna ports.

Upon the acquisition of the channel information about the reference resources corresponding to the intra-group PMIs on all the groups of antenna ports, it is necessary to acquire the inter-group PMI, the RI and the CQI to be fed back to the base station based on the channel information. In a possible embodiment of the present disclosure, Step 74 may include the following steps.

Step 741: acquiring the inter-group PMI based on the channel information and a preconfigured inter-group codebook set. It should be appreciated that, in order to acquire the inter-group PMI, the calculation may be performed on the channel information and each PMI in the intra-group codebook, so as to acquire the PMI having an optimum operation result. Then, the optimum PMI may be taken as the inter-group PMI to be fed back.

Step 742: acquiring the RI and the CQI based on the channel information. It should be appreciated that, the RI and the CQI to be fed back may be acquired using a known method, which will not be particularly defined herein.

Corresponding to the method at the base station, in actual use, a feedback procedure at the UE side will be described hereinafter.

S21: receiving, by the UE, the CSI-RS corresponding to Q CSI-RS resources via P groups of antenna ports, calculating an average value of the RSRP of the CSI-RS corresponding to each CSI-RS resource received via the P groups of antenna ports, comparing Q average values of RSRP and selecting a PMI corresponding to the largest average value of the RSRP as the intra-group PMI to be fed back (i.e., $PMI^{intra}$).

S22: performing the channel measurement on the P CSI-RSs corresponding to the CSI-RS resource corresponding to the intra-group PMI $PMI^{intra}$, so as to acquire the channel information corresponding to the P groups of antenna ports (i.e., $H^{inter} \in C^{P \times N_{RxAnt}}$). $N_{RxAnt}$ represents the number of antennae of the UE, and C represents a dimension.

S23: calculating, by the UE, the inter-group PMI to be fed back (i.e., $PMI^{inter}$) based on $H^{inter} \in C^{P \times N_{RxAnt}}$ and the inter-group $W_{codebook}^{inter}$, and calculating the RI and the CQI based on $H^{inter} \in C^{P \times N_{RxAnt}}$.

Step 24: feeding back the $PMI^{intra}$, $PMI^{inter}$, the RI and the CQI as the CSI to the base station, so that the base station may select a corresponding M*1-dimension intra-group PMI (i.e., $w^{PMI_{intra}}$) based on $PMI^{intra}$, select a corresponding $N_H \times Z$-dimension inter-group PMI (i.e., $w^{PMI_{inter}}$) based on $PMI^{inter}$, and calculate a 3D precoding matrix $w^{3D} = w^{PMI_{inter}} \otimes w^{PMI_{intra}}$, which is a $N_H \times (Z \times M)$ matrix. Then, the base station may calculate a link adaptation parameter based on the $w^{3D}$, the RI and the CQI fed back by the UE.

According to this embodiment of the present disclosure, the CSI-RSs are configured in a two-stage manner, i.e., an inter-group non-beamforming mode and an intra-group beamforming mode. The inter-group CSI-RS configuration uses beamforming directions suitable to the UE, and the inter-group non-beamforming mode is used, so as to improve the coverage range as compared with the method based on the non-beamformed CSI-RSs using the antenna ports and improve the angular range as compared with the method based on the beamformed CSI-RSs using all the antenna ports in the vertical direction, thereby to transmit a 3D beam in a more accurate manner. In addition, it is able to reduce the number of the CSI-RSs to be transmitted, save the channel resource and improve the system efficiency.

Seventh Embodiment

Figure 8:
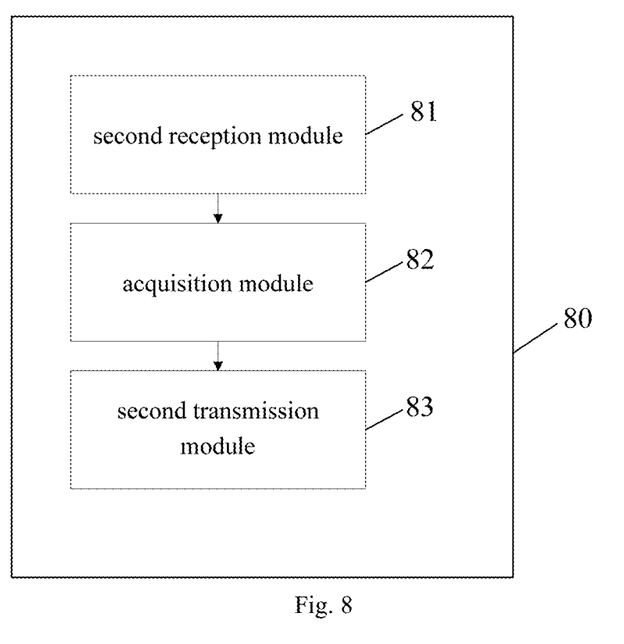
FIG. 8 is a schematic module view showing a UE according to the seventh embodiment of the present disclosure.

As shown in FIG. 8, the present disclosure provides in this embodiment a UE 80, which includes: a second reception module 81 configured to receive reference signals corresponding to a plurality of reference resources from a base station, the reference signal being configured by the base station for each group of a plurality of groups of antenna ports, each group of antenna ports being configured by the base station with a same intra-group codebook set consisting of a plurality of intra-group precoding matrices, a plurality of different reference signals corresponding to a same reference resource being configured by the base station for each group of antenna ports, each antenna port in each group of antenna ports being configured by the base station with a precoded reference signal acquired after a precoding operation using the intra-group precoding matrices, the number of the reference resources being the same as the number of the intra-group precoding matrices in the intra-group codebook set, and the number of the reference signals corresponding to each reference resource being the same as the number of groups of inter-group antenna ports; an acquisition module 82 configured to measure each reference signal corresponding to the reference resource so as to acquire CSI; and a second transmission module 83 configured to transmit the acquired CSI to the base station.

It should be appreciated that, the reference resource is a CSI-RS resource, and the reference signal is a CSI-RS. The number of the CSI-RS resources is the same as the number of the intra-group precoding matrices in the intra-group codebook set, and the number of the CSI-RSs corresponding to each CSI-RS resource is the same as the group number of the inter-group antenna ports. The CSI-RSs corresponding to a same CSI-RS resource allocated for each group of antenna ports are precoded with a same intra-group precoding matrix so as to form beams in a same direction, the CSI-RSs corresponding to different CSI-RS resources allocated for a same group of antenna ports are precoded with different intra-group precoding matrices so as to form beams in different directions, and the beams formed by the different intra-group precoding matrices evenly cover an entire angular range in the vertical direction.

In a possible embodiment of the present disclosure, the acquisition module 82 includes: a first acquisition sub-module configured to measure the reference signals corresponding to the reference resources respectively, so as to acquire intra-group PMIs to be fed back to the base station; a second acquisition sub-module configured to acquire channel information about each reference signal corresponding to the reference resource corresponding to each intra-group precoding matrix on each group of antenna ports; and a third acquisition sub-module configured to acquire an inter-group PMI, a RI and a CQI to be fed back to the base station based on the channel information, and take the intra-group PMI, the inter-group PMI, the RI and the CQI as the CSI.

In a possible embodiment of the present disclosure, the first acquisition sub-module includes: a calculation unit configured to calculate average values of RSRP of the reference signals corresponding to each reference resource on all the groups of antenna ports; and a first acquisition unit configured to acquire a PMI corresponding to the RSRP having a largest average value, and take the PMI as the intra-group PMI.

To be specific, the second acquisition sub-module is further configured to perform channel measurement on the reference signals corresponding to the reference resources corresponding to the intra-group PMIs on all the groups of antenna ports, so as to acquire channel information corresponding to each group of antenna ports.

In a possible embodiment of the present disclosure, the third acquisition sub-module includes: a second acquisition unit configured to acquire the inter-group PMI based on the channel information and a preconfigured inter-group codebook set; and a third acquisition unit configured to acquire the RI and the CQI based on the channel information.

It should be appreciated that, the implementation of the UE may refer to that of the above-mentioned method, with a same technical effect.

Eighth Embodiment

Figure 9:
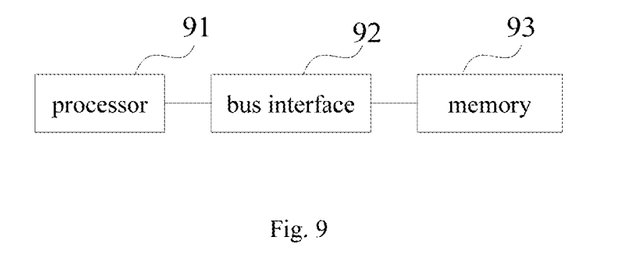
FIG. 9 is a schematic structure view showing a UE according to the eighth embodiment of the present disclosure.

As shown in FIG. 9, the present disclosure provides in this embodiment a UE, which includes: a processor 91; and a memory 93 connected to the processor 91 via a bus interface 92 and configured to store therein programs and data for the operation of the processor 91. The processor 91 is configured to call and execute the programs and data stored in the memory 93, so as to implement the following functional modules: a second reception module for receiving reference signals corresponding to a plurality of reference resources from a base station, the reference signal being configured by the base station for each of a plurality of groups of antenna ports, each group of antenna ports being configured by the base station with a same intra-group codebook set consisting of a plurality of intra-group precoding matrices, a plurality of different reference signals corresponding to a same reference resource being configured by the base station for each group of antenna ports, each antenna port in each group of antenna ports being configured by the base station with a precoded reference signal acquired after a precoding operation using the intra-group precoding matrices, the number of the reference resources being the same as the number of the intra-group precoding matrices in the intra-group codebook set, and the number of the reference signals corresponding to each reference resource being the same as the number of groups of inter-group antenna ports; an acquisition module for measuring each reference signal corresponding to the reference resource so as to acquire CSI; and a second transmission module for transmitting the acquired CSI to the base station. The processor 91 is also used for implement the function of any other module of the above feedback device.

It should be appreciated that, all or parts of the above-mentioned steps may be implemented through hardware or a computer program. The computer program includes instructions for executing parts of or all of the steps in the above-mentioned method. In addition, the computer program may be stored in a computer-readable storage medium in any form.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for feeding back Channel State Information (CSI), comprising steps of:
dividing a plurality of antenna ports into a plurality of groups of antenna ports;
configuring for each group of antenna ports a same intra-group codebook set consisting of a plurality of intra-group precoding matrices, allocating for each group of antenna ports a plurality of different reference signals corresponding to a same reference resource, and configuring for each antenna port in each group of antenna ports a precoded reference signal acquired after a precoding operation using the intra-group precoding matrices, a number of the reference resources corresponding to a number of the intra-group precoding matrices in the intra-group codebook set, and a number of the reference signals corresponding to each reference resource corresponding to a number of groups of inter-group antenna ports;
transmitting the precoded reference signal to a User Equipment (UE) via each antenna port; and
receiving the CSI fed back by the UE based on measurement on the reference signal.

2. The method according to claim 1, wherein the step of dividing the plurality of antenna ports into the plurality of groups of antenna ports comprises dividing, in a row-based or column-based manner, the plurality of antenna ports into the plurality of groups of antenna ports based on one dimension of the antenna ports using a same grouping mode.

3. The method according to claim 2, wherein when dividing the plurality of antenna ports based on a vertical dimension of the antenna ports, the step of dividing, in the row-based or column-based manner, the plurality of antenna ports into the plurality of groups of antenna ports based on one dimension of the antenna ports using a same grouping mode comprises dividing every M antenna ports in each column of antenna ports in a vertical direction into one group, each column of antenna ports being divided into a same number of groups, and M representing a predetermined number of antenna ports in each group.

4. The method according to claim 1, wherein the reference resource is a Channel State Information-Reference Signal (CSI-RS) resource, and the reference signal is a CSI-RS;
a number of the CSI-RS resources is the same as a number of the intra-group precoding matrices in the intra-group codebook set, a number of the CSI-RSs corresponding to each CSI-RS resource is the same as a number of groups of the inter-group antenna ports; and
the CSI-RSs corresponding to a same CSI-RS resource allocated for each group of antenna ports are precoded with a same intra-group precoding matrix so as to form beams in a same direction, the CSI-RSs corresponding to different CSI-RS resources allocated for a same group of antenna port are precoded with different intra-group precoding matrices so as to form beams in different directions, and the beams formed by the different intra-group precoding matrices evenly cover an entire angular range in a vertical direction.

5. The method according to claim 4, wherein the step of transmitting the precoded reference signal to the UE via each antenna port comprises:
when the CSI-RS resource is a frequency-domain resource, transmitting the precoded reference signal to the UE via each antenna port within a same subframe; or
when the CSI-RS resource is a time-domain resource, transmitting the precoded reference signal to the UE via each antenna port within different subframes.

6. The method according to claim 1, wherein the CSI comprises an intra-group precoding matrix indicator (PMI), an inter-group PMI, a rank indicator (RI) and a channel quality indicator (CQI).

7. The method according to claim 6, wherein the CSI is obtained by the steps of:
measuring, by the UE, the reference signal corresponding to each reference resource, so as to acquire an intra-group PMI to be fed back to a base station;
acquiring channel information about the reference signal corresponding to the reference resource corresponding to the intra-group PMI on each group of antenna ports;
acquiring an inter-group PMI, a RI and a CQI fed back to the base station based on the channel information; and
taking the intra-group PMI, the inter-group PMI, the RI and the CQI as the CSI.

8. The method according to claim 7, wherein the step of measuring, by the UE, the reference signal corresponding to each reference resource, so as to acquire an intra-group PMI to be fed back to a base station comprises calculating average values of Reference Signal Received Power (RSRP) of the reference signals corresponding to each reference resource on all the groups of antenna ports respectively, acquiring a PMI corresponding to the RSRP having the largest average value, and taking the PMI as the intra-group PMI.

9. The method according to claim 7, wherein the step of acquiring the inter-group PMI, the RI and the CQI fed back to the base station based on the channel information includes acquiring the inter-group PMI based on the channel information and a preconfigured inter-group codebook, and acquiring the RI and the CQI based on the channel information.

10. A base station, comprising:
a processor; and
a memory connected to the processor via a bus interface and configured to store therein programs and data for the operation of the processor,
wherein the processor is configured to call and execute the programs and data stored in the memory, so as to:
divide a plurality of antenna ports into a plurality of groups of antenna ports;
configure for each group of antenna ports a same intra-group codebook set consisting of a plurality of intra-group precoding matrices, allocating for each group of antenna ports a plurality of different reference signals corresponding to a same reference resource, and configure for each antenna port in each group of antenna ports a precoded reference signal acquired after a precoding operation using the intra-group precoding matrices, a number of the reference resources corresponding to a number of the intra-group precoding matrices in the intra-group codebook set, and a number of the reference signals corresponding to each reference resource corresponding to a number of groups of inter-group antenna ports;
transmit the precoded reference signal to a User Equipment (UE) via each antenna port; and
receive Channel State Information (CSI) fed back by the UE based on measurement on the reference signal.

11. A method for feeding back Channel State Information (CSI), comprising steps of:
receiving reference signals corresponding to a plurality of reference resources from a base station, the reference signal being configured by the base station for each group of a plurality of groups of antenna ports, each group of antenna ports being configured by the base station with a same intra-group codebook set consisting of a plurality of intra-group precoding matrices, a plurality of different reference signals corresponding to a same reference resource being configured by the base station for each group of antenna ports, each antenna port in each group of antenna ports being configured by the base station with a precoded reference signal acquired after a precoding operation using the intra-group precoding matrices, a number of the reference resources corresponding to a number of the intra-group precoding matrices in the intra-group codebook set, and a number of the reference signals corresponding to each reference resource corresponding to a number of groups of inter-group antenna ports;
measuring each reference signal corresponding to the reference resource so as to acquire the CSI; and
transmitting the acquired CSI to the base station.

12. The method according to claim 11, wherein the step of measuring each reference signal corresponding to the reference resource so as to acquire the CSI comprises:
measuring the reference signals corresponding to the reference resources respectively, so as to acquire intra-group precoding matrix indicators (PMIs) to be fed back to the base station;
acquiring channel information about each reference signal corresponding to the reference resource corresponding to each intra-group PMI on each group of antenna ports;
acquiring an inter-group PMI, a rank indicator (RI) and a channel quality indicator (CQI) to be fed back to the base station based on the channel information; and
taking the intra-group PMI, the inter-group PMI, the RI and the CQI as the CSI.

13. The method according to claim 12, wherein the step of measuring the reference signals corresponding to the reference resources respectively so as to acquire the intra-group PMIs to be fed back to the base station comprises:
calculating average values of Reference Signal Received Power (RSRP) of the reference signals corresponding to each reference resource on all the groups of antenna ports; and
acquiring a PMI corresponding to the RSRP having a largest average value, and taking the PMI as the intra-group PMI.

14. The method according to claim 12, wherein the step of acquiring the channel information about the reference signals corresponding to the reference resources corresponding to the intra-group PMIs on each group of antenna ports comprises performing channel measurement on the reference signals corresponding to the reference resources corresponding to the intra-group PMIs on all the groups of antenna ports, so as to acquire the channel information corresponding to each group of antenna ports.

15. The method according to claim 12, wherein the step of acquiring the inter-group PMI, the RI and the CQI to be fed back to the base station based on the channel information comprises:

acquiring the inter-group PMI based on the channel information and a preconfigured inter-group codebook set; and acquiring the RI and the CQI based on the channel information.

16. The method according to claim 11, wherein the reference resource is a Channel State Information-Reference Signal (CSI-RS) resource, and the reference signal is a CSI-RS;

a number of the CSI-RS resources is the same as a number of the intra-group precoding matrices in the intra-group codebook set, and a number of the CSI-RSs corresponding to each CSI-RS resource is the same as a number of groups of the inter-group antenna ports; and the CSI-RSs corresponding to a same CSI-RS resource allocated for each group of antenna ports are precoded with a same intra-group precoding matrix so as to form beams in a same direction, the CSI-RSs corresponding to different CSI-RS resources allocated for a same group of antenna port are precoded with different intra-group precoding matrices so as to form beams in different directions, and the beams formed by the different intra-group precoding matrices evenly cover an entire angular range in a vertical direction.

17. A User Equipment (UE), comprising:
a processor; and
a memory connected to the processor via a bus interface and configured to store therein programs and data for the operation of the processor,
wherein the processor is configured to call and execute the programs and data stored in the memory, so as to:
receive reference signals corresponding to a plurality of reference resources from a base station, the reference signal being configured by the base station for each group of a plurality of groups of antenna ports, each group of antenna ports being configured by the base station with a same intra-group codebook set consisting of a plurality of intra-group precoding matrices, a plurality of different reference signals corresponding to a same reference resource being configured by the base station for each group of antenna ports, each antenna port in each group of antenna ports being configured by the base station with a precoded reference signal acquired after a precoding operation using the intra-group precoding matrices, a number of the reference resources corresponding to a number of the intra-group precoding matrices in the intra-group codebook set, and a number of the reference signals corresponding to each reference resource corresponding to a number of groups of inter-group antenna ports;
measure each reference signal corresponding to the reference resource so as to acquire Channel State Information (CSI); and
transmit the acquired CSI to the base station.

* * * * *